United States Patent
Hasegawa et al.

(10) Patent No.: US 9,357,007 B2
(45) Date of Patent: May 31, 2016

(54) CONTROLLING STORING OF DATA

(75) Inventors: Tohru Hasegawa, Kanagawa (JP); Naoki Imai, Kanagawa (JP); Masanori Kamiya, Kanagawa (JP); Yutaka Oishi, Kanagawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 956 days.

(21) Appl. No.: 13/463,103

(22) Filed: May 3, 2012

(65) Prior Publication Data

US 2012/0290801 A1 Nov. 15, 2012

(30) Foreign Application Priority Data

May 10, 2011 (JP) ................................ 2011-105734

(51) Int. Cl.
*G06F 12/02* (2006.01)
*H04L 29/08* (2006.01)
*G06F 17/30* (2006.01)

(52) U.S. Cl.
CPC ...... *H04L 67/1097* (2013.01); *G06F 17/30156* (2013.01)

(58) Field of Classification Search
None
See application file for complete search history.

(56) References Cited

U.S. PATENT DOCUMENTS 3,221,308 A * 11/1965 Petersen et al. ............... 711/108
6,330,621 B1 * 12/2001 Bakke et al. ...................... 710/5

FOREIGN PATENT DOCUMENTS

| JP | 61198369 A | 9/1986 |
| JP | 2008310450 A | 12/2008 |
| JP | 2009181479 A | 8/2009 |
| JP | 2010170475 A | 8/2010 |
| JP | 2011507100 A | 3/2011 |
| WO | 2012124178 A1 | 9/2012 |

* cited by examiner

Primary Examiner — Charles Rones
Assistant Examiner — Ryan Dare
(74) Attorney, Agent, or Firm — Griffiths & Seaton PLLC

(57) ABSTRACT

First characteristic information indicating a characteristic of input data is extracted from the input data that is input as data to be stored in any of the storages. Second characteristic information elements are read from a memory unit storing the second characteristic information elements indicating respective characteristics of stored data elements stored in the storages. A specific storage in which the input data is to be stored is determined, out of the storages, by determining a degree of match between the extracted first characteristic information and the second characteristic information elements read. The input data to the determined specific storage is read. The second characteristic information element indicating the characteristic of the stored data element stored in the specific storage is updated, out of the second characteristic information elements retained in the memory unit, on the basis of the extracted first characteristic information.

17 Claims, 7 Drawing Sheets

FIG. 2

| NODE ID | METADATA (1) | DEGREE OF IMPORTANCE (1) | METADATA (2) | DEGREE OF IMPORTANCE (2) | METADATA (3) | DEGREE OF IMPORTANCE (3) | METADATA (4) | DEGREE OF IMPORTANCE (4) | ... |
|---|---|---|---|---|---|---|---|---|---|
| A | MA1 | SA1 | MA2 | SA2 | MA3 | SA3 | MA4 | SA4 | ... |
| B | MB1 | SB1 | MB2 | SB2 | MB3 | SB3 | MB4 | SB4 | ... |
| C | MC1 | SC1 | MC2 | SC2 | MC3 | SC3 | MC4 | SC4 | ... |
| ... | ... | ... | ... | ... | ... | ... | ... | ... | ... |

FIG. 4

| NODE ID | METADATA (1) | DEGREE OF IMPORTANCE (1) | METADATA (2) | DEGREE OF IMPORTANCE (2) | METADATA (3) | DEGREE OF IMPORTANCE (3) | METADATA (4) | DEGREE OF IMPORTANCE (4) | ... | ... | ... |
|---|---|---|---|---|---|---|---|---|---|---|---|
| A | DIFFERENTIATION | 8 | NON-EUCLIDEAN GEOMETRY | 2 | GROUP THEORY | 3 | FOCUS | 3 | ... | ... | ... |
| B | WIND | 3 | SONG | 2 | FOREST | 2 | FOCUS | 1 | ... | ... | ... |

CONTROLLING STORING OF DATA

PRIORITY CLAIM

This application claims priority to Japanese Patent Application No. 2011-105734, filed May 10, 2011, which is hereby incorporated by reference in its entirety.

FIELD OF THE INVENTION

The present invention relates to computers, and more specifically, to controlling storing of data in storages by a processor device that can store data in a state in which duplicates of data having the same or similar characteristics are removed.

DESCRIPTION OF THE RELATED ART

In today's society, computer systems are commonplace. The amount of data dealt with in a computer system is drastically increasing, and efforts are being made to improve the efficiency of storage utilization by compressing data in the storage. There are two typical methods for improving the efficiency of storage utilization: (1) File compression method, and (2) a method using the function of removing duplicates (hereinafter referred to as the de-duplication function) in a storage system. Of these two methods, the file compression method is a compression method on a file basis and is the traditional used method. Recently, storages have been widely used by ordinary users, and similar data has often been stored by different users, so the de-duplication function in the de-duplication function has become increasingly important. The efficiency of storage utilization can be further improved with the de-duplication function, because duplicates of data in joint photographic experts group (JPEG), motion picture experts group (MPEG), and the like, which has already been compressed and cannot be supported by compression on a file basis, between different instances are also removed. One known technique is concurrent processing of summarizing an enormous amount of raw data and generating various summary data using multiple processors. However, in order to adapt to an increase in the amount of data to be stored, a storage systems requires a scalable configuration, typified by a cloud storage environment using multiple storage systems. Yet problems arise when data is stored in the multiple storage systems and the overall efficiency of storage utilization cannot be improved. Existing solutions only generate summary data from raw data and are not intended to improve the efficiency of storage utilization in locating raw data. Thus a need exists for improving the overall efficiency of storage utilization in storing data in storages.

SUMMARY OF THE DESCRIBED EMBODIMENTS

Accordingly, and in view of the foregoing, various exemplary method, system, and computer program product embodiments for controlling storing of data in storages that can store data in a state in which duplicates of data having the same or similar characteristics are removed. First characteristic information indicating a characteristic of input data is extracted from the input data that is input as data to be stored in any of the storages. Second characteristic information elements are read from a memory unit storing the second characteristic information elements indicating respective characteristics of stored data elements stored in the storages. A specific storage in which the input data is to be stored is determined, out of the storages, by determining a degree of match between the extracted first characteristic information and the second characteristic information elements read. The input data to the determined specific storage is read. The second characteristic information element indicating the characteristic of the stored data element stored in the specific storage is updated, out of the second characteristic information elements retained in the memory unit, on the basis of the extracted first characteristic information The present invention relates to apparatuses and methods for controlling storing of data. In particular, the present invention relates to an apparatus and a method for controlling storing of data in a plurality of storages that can store data in a state in which duplicates of data having the same or similar characteristics are removed.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which:

FIG. 2 illustrates an example of a content retained in a summary data memory unit in the embodiment of the present invention;

FIG. 4 is an illustration for use in specifically describing an operation in a storage node in the embodiment of the present invention;

Figure 1:
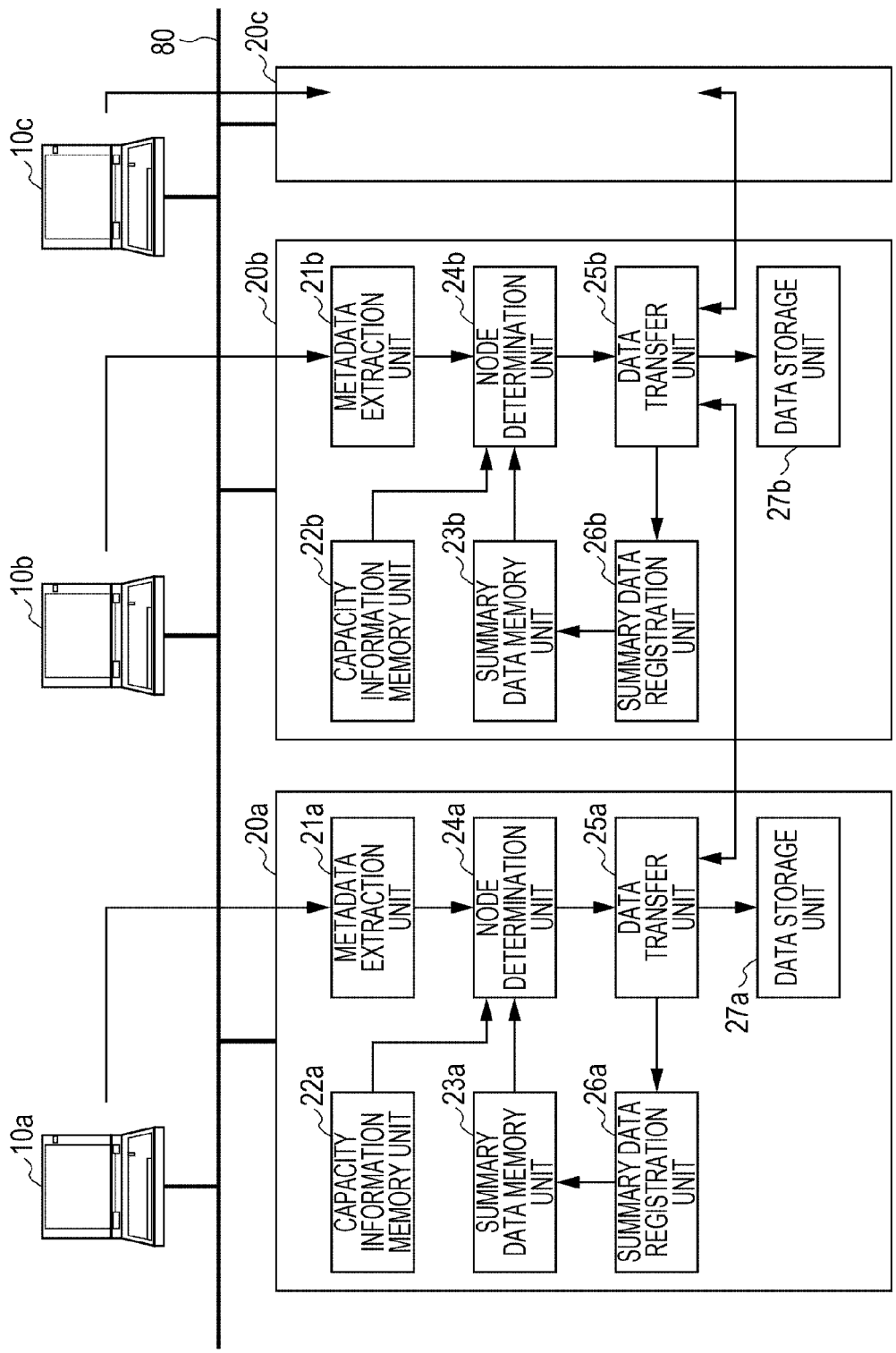
FIG. 1 is a block diagram illustrating an example configuration of a computer system to which a first embodiment of the present invention is applied.

The detailed description explains the preferred embodiments of the invention, together with advantages and features, by way of example with reference to the drawings.

DETAILED DESCRIPTION OF CERTAIN EMBODIMENTS

As mentioned above, the illustrated embodiments seek to provide a system for storing data in a plurality of storage nodes. Each storage node includes a storage unit, an extraction unit, a memory unit, a determination unit, a transfer unit, and an updating unit. The storage unit is configured to store data in a state in which duplicates of data having the same or similar characteristics are removed. The extraction unit is configured to extract, from input data that is input to storage nodes, first characteristic information indicating a characteristic of the input data. The memory unit is configured to retain second characteristic information elements indicating respective characteristics of stored data elements stored in the storage units in the storage nodes, each of the second characteristic information elements including extracted information elements extracted from the respective stored data elements and weight information elements indicating respective weights of the extracted information elements. The determination unit is configured to determine a specific storage node in which the input data is to be stored, out of the storage nodes, by determining a degree of match between the first characteristic information extracted by the extraction unit and each of the second characteristic information elements retained in the memory unit on the basis of the weight information element indicating the weight of the extracted information element having a characteristic that is the same as or similar to the first characteristic information out of the extracted information elements included in each of the second characteristic information elements. The transfer unit is configured to, when the specific storage node determined by the determination unit is the storage node of its own, transfer the input data to the storage unit in the storage node of its own and, when the specific storage node determined by the determination unit is another storage node, transfer the input data to the other storage node. The updating unit is configured to, when the input data is transferred by the transfer unit to the storage unit in the storage node of its own, update the second characteristic information element indicating the characteristic of the stored data element stored in the storage unit in the storage node of its own, out of the second characteristic information elements retained in the memory unit, on the basis of the first characteristic information extracted by the extraction unit.

The updating unit may be configured to, when another second characteristic information element indicating the characteristic of the data element stored in the storage unit in another storage node is transferred from the other storage node, update the second characteristic information element indicating the characteristic of the data element stored in the storage unit in the other storage node, on the basis of the other second characteristic information element.

The illustrated embodiments also provide a system for controlling storing of data in storage nodes using a control node. Each of the storage nodes includes a storage unit configured to store data in a state in which duplicates of data having the same or similar characteristics are removed. The control node includes an extraction unit, a memory unit, a determination unit, a transfer unit, and an updating unit. The extraction unit is configured to extract, from input data input into the system, first characteristic information indicating a characteristic of the input data. The memory unit is configured to retain second characteristic information elements indicating respective characteristics of stored data elements stored in the storage units in the storage nodes, each of the second characteristic information elements including extracted information elements extracted from the respective stored data elements and weight information elements indicating respective weights of the extracted information elements. The determination unit is configured to determine a specific storage node in which the input data is to be stored, out of the storage nodes, by determining a degree of match between the first characteristic information extracted by the extraction unit and each of the second characteristic information elements retained in the memory unit on the basis of the weight information element indicating the weight of the extracted information element having a characteristic that is the same as or similar to the first characteristic information out of the extracted information elements included in each of the second characteristic information elements. The transfer unit is configured to transfer the input data to the storage unit in the specific storage node determined by the determination unit. The updating unit is configured to update the second characteristic information element indicating the characteristic of the stored data element stored in the storage unit in the specific storage node, out of the second characteristic information elements retained in the memory unit, on the basis of the first characteristic information extracted by the extraction unit.

The illustrated embodiments also provide an apparatus for controlling storing of data in storages that can store data in a state in which duplicates of data having the same or similar characteristics are removed. The apparatus includes an extraction unit, a memory unit, a determination unit, a transfer unit, and an updating unit. The extraction unit is configured to extract, from input data input as data to be stored in any of the storages, first characteristic information indicating a characteristic of the input data. The memory unit is configured to retain second characteristic information elements indicating respective characteristics of stored data elements stored in the storages. The determination unit is configured to determine a specific storage in which the input data is to be stored, out of the storages, by determining a degree of match between the first characteristic information extracted by the extraction unit and each of the second characteristic information elements retained in the memory unit. The transfer unit is configured to transfer the input data to the specific storage determined by the determination unit. The updating unit is configured to update the second characteristic information element indicating the characteristic of the stored data element stored in the specific storage, out of the second characteristic information elements retained in the memory unit, on the basis of the first characteristic information extracted by the extraction unit.

Each of the second characteristic information elements may include extracted information elements extracted from the respective stored data elements stored in the storages. The determination unit may be configured to determine the degree of match on the basis of a number of extracted information elements having a characteristic that is the same as or similar to the first characteristic information extracted by the extraction unit, out of the extracted information elements included in each of the second characteristic information elements retained in the memory unit. Each of the second characteristic information elements may include extracted information elements extracted from the respective stored data elements stored in the storages and weight information elements indicating respective weights of the extracted information elements. The determination unit may be configured to determine the degree of match on the basis of the weight information element indicating the weight of the extracted information element having a characteristic that is the same as or similar to the first characteristic information extracted by the extraction unit, out of the extracted information elements included in each of the second characteristic information elements.

The determination unit may be configured to determine the specific storage on the basis of the degree of match and an amount of the stored data element stored in each of the storages.

The extraction unit may be configured to extract, from the stored data element stored in a first storage of the storages, the first characteristic information indicating a characteristic of the first storage. The determination unit may be configured to redetermine a storage in which the stored data element is to be stored, out of the storages, by determining the degree of match between the first characteristic information extracted by the extraction unit and each of the second characteristic information elements retained in the memory unit. The transfer unit may be configured to, when the storage determined by the determination unit is another storage other than the first storage, transfer the stored data element to the other storage.

The illustrated embodiments also provide a method for controlling storing of data in storages that can store data in a state in which duplicates of data having the same or similar characteristics are removed. The method includes the steps of extracting, from input data input as data to be stored in any of the storages, first characteristic information indicating a characteristic of the input data, reading, from a memory unit storing a second characteristic information elements indicating respective characteristics of stored data elements stored in the storages, each of the second characteristic information elements, determining a specific storage in which the input data is to be stored, out of the storages, by determining a degree of match between the extracted first characteristic information and each of the second characteristic information elements read, transferring the input data to the determined specific storage, and updating the second characteristic information element indicating the characteristic of the stored data element stored in the specific storage, out of the second characteristic information elements retained in the memory unit, on the basis of the extracted first characteristic information.

The illustrated embodiments also provide a program for causing a computer to function as an apparatus for controlling storing of data in storages that can store data in a state in which duplicates of data having the same or similar characteristics are removed. The program causes the computer to function as an extraction unit, a reading unit, a determination unit, a transfer unit, and an updating unit. The extraction unit is configured to extract, from input data input as data to be stored in any of the storages, first characteristic information indicating a characteristic of the input data. The reading unit is configured to read, from a memory unit storing a second characteristic information elements indicating respective characteristics of stored data elements stored in the storages, each of the second characteristic information elements. The determination unit is configured to determine a specific storage in which the input data is to be stored, out of the storages, by determining a degree of match between the first characteristic information extracted by the extraction unit and each of the second characteristic information elements read by the reading unit. The transfer unit is configured to transfer the input data to the specific storage determined by the determination unit. The updating unit is configured to update the second characteristic information element indicating the characteristic of the stored data element stored in the specific storage, out of the second characteristic information elements retained in the memory unit, on the basis of the first characteristic information extracted by the extraction unit.

Turning now to FIG. 1, a block diagram is depicted that illustrates an example configuration of a computer system to which a first embodiment is applied. As illustrated in FIG. 1, the computer system is configured such that clients 10a to 10c and storage nodes 20a to 20c are connected over a network 80. The clients 10a to 10c are computers that can transmit data to be stored (hereinafter referred to as "storing target data") to the storage nodes 20a to 20c, respectively, over the network 80. The clients 10a to 10c illustrated in FIG. 1 may be referred to as the clients 10 when it is not necessary to differentiate among them. In FIG. 1, the number of the clients 10 is three, but any number may be used.

The storage nodes 20a to 20c are nodes containing storages that can store storing target data received from the clients 10a to 10c, respectively. The storage nodes 20a to 20c illustrated in FIG. 1 may be referred to as the storage nodes 20 when it is not necessary to differentiate among them. In FIG. 1, the number of the storage nodes 20 is three, but any number may be used. The configuration of each of the storage nodes 20 is described below.

The storage node 20 includes a metadata extraction unit 21, a capacity information memory unit 22, a summary data memory unit 23, a node determination unit 24, a data transfer unit 25, a summary data registration unit 26, and a data storage unit 27. In FIG. 1, the reference numerals of the components of the storage node 20 have the affixes "a" and "b", but they do not have the affixes "a" and "b" in the description below.

The metadata extraction unit 21 extracts metadata from storing target data received from the client 10. When the storing target data is text data, a keyword contained in the text data may be extracted as the metadata. For example, nouns that occur with high frequencies in text data may be listed as keywords. A keyword that corresponds to the gist of text data may be added to a list by a known text mining technique. When the storing target data is data from which a keyword cannot be extracted, such as image data, the body of the storing target data may be divided into a plurality of blocks, and a calculated hash value in each block may be the metadata. When the storing target data has additive information, that additive information may be captured in the metadata. After extracting the metadata, the metadata extraction unit 21 outputs the metadata together with the storing target data to the node determination unit 24. In the present embodiment, the storing target data is used as one example of input data, the metadata is used as one example of first characteristic information indicating a characteristic of the input data, and the metadata extraction unit 21 is disposed as one example of an extraction unit configured to extract the first characteristic information from the input data.

The capacity information memory unit 22 retains information in which the identifier for identifying each of the storage nodes 20a to 20c (hereinafter referred to as "node ID") and a currently used capacity of a storage in the storage node 20 corresponding to the node ID are associated with each other (hereinafter, the information is referred to as "capacity information").

The summary data memory unit 23 retains correlation between the node ID of each of the storage nodes 20a to 20c and summary data in which the metadata in data stored in the storage in the storage node 20 of that node ID and the degree of importance of that metadata are combined. When the metadata is a keyword, the frequency of occurrence of the keyword may be the degree of importance. In the present embodiment, the metadata is used as one example of a plurality of second characteristic information elements indicating respective characteristics of stored data elements and the summary data memory unit 23 is disposed as one example of a memory unit configured to retain the plurality of second characteristic information elements.

The node determination unit 24 compares the metadata received from the metadata extraction unit 21 and the summary data corresponding to each node ID retained in the summary data memory unit 23 and determines which of the storage nodes 20 the storing target data is to be transferred to, on the basis of the degree of match between the metadata and the summary data. In this case, it may be determined that the storage node 20 of the node ID corresponding to summary data having the highest degree of match with the metadata received from the metadata extraction unit 21 out of summary data retained in the summary data memory unit 23 is the storage node 20 to which the storing target data is to be transferred. At that time, the capacity information retained in the capacity information memory unit 22 is also taken into consideration. When the storing target data does not match the summary data corresponding to any node ID, the storage node 20 to which the storing target data is to be transferred is determined by a known allocation method, such as consistent hashing. The node ID of the determined storage node 20, the storing target data, and the metadata are output to the data transfer unit 25. In the present embodiment, the node determination unit 24 is disposed as one example of a determination unit configured to determine a specific storage node in which input data is to be stored and as one example of a determination unit configured to determine a specific storage in which input data is to be stored.

When the node ID received from the node determination unit 24 indicates the node in which the data transfer unit 25 is included, the data transfer unit 25 transfers the storing target data received from the node determination unit 24 to the data storage unit 27 in its own node and also outputs the metadata received from the node determination unit 24 to the summary data registration unit 26 in its own node. When the node ID received from the node determination unit 24 indicates another storage node 20 other than the node in which the data transfer unit 25 is included, the data transfer unit 25 transfers the storing target data and the metadata received from the node determination unit 24 to the data transfer unit 25 in that storage node 20. When the data transfer unit 25 receives storing target data and metadata transferred from another storage node 20 other than the node in which the data transfer unit 25 is included, the data transfer unit 25 stores the storing target data in the data storage unit 27 and also outputs the metadata to the summary data registration unit 26. The data transfer unit 25 also functions when summary data retained in the summary data memory unit 23 is regularly exchanged with another storage node 20. That is, when receiving summary data transferred from another storage node 20, the data transfer unit 25 outputs the node ID of that storage node 20 and the summary data to the summary data registration unit 26. In the present embodiment, the data transfer unit 25 is disposed as one example of a transfer unit configured to transfer input data to the storage unit in the storage node of its own or to another storage node and as one example of a transfer unit configured to transfer input data to a specific storage.

The summary data registration unit 26 registers the metadata in the storing target data in its own node received from the data transfer unit 25 such that it is contained in the summary data retained in the summary data memory unit 23 in association with the node ID of its own node. The summary data registration unit 26 also registers the summary data in another storage node 20 received from the data transfer unit 25 such that it is contained in the summary data retained in the summary data memory unit 23 in association with the node ID of that storage node 20. In the present embodiment, the summary data registration unit 26 is disposed as one example of an updating unit configured to update the second characteristic information element indicating the characteristic of the stored data element stored in the storage unit in the storage node of its own out of the plurality of second characteristic information elements on the basis of the first characteristic information and as one example of an updating unit configured to update the second characteristic information element indicating the characteristic of the stored data element stored in the specific storage out of the plurality of second characteristic information elements on the basis of the first characteristic information.

The data storage unit 27 is a storage that can store storing target data received from the client 10 or another storage node 20. Here, the data storage unit 27 has a known de-duplication function, by which duplicates of the stored data can be removed. In the present embodiment, the de-duplication function is used as one example of the function of storing data in a state in which duplicates of data having the same or similar characteristics are removed, and the data storage unit 27 is disposed as one example of a storage unit configured to store data.

At this point, a content retained in the summary data memory unit 23 is described. FIG. 2 illustrates an example of information retained in the summary data memory unit 23. As illustrated in FIG. 2, correlation between each of the node IDs and a plurality of combinations of metadata and degree of importance is retained in the summary data memory unit 23. The node ID is the identifier for identifying the storage node 20, as previously described.

The metadata is metadata in data stored in the data storage unit 27 in the storage node 20 of the corresponding node ID. When the stored data is text data, a keyword may be used as the metadata. When the stored data is another type of data, such as image data, a hash value of each block may be used as the metadata. In the present embodiment, metadata in summary data is used as one example of extracted information extracted from a stored data.

The degree of importance is information that indicates the degree of importance of metadata in calculating the degree of match with the metadata in storing target data. For example, in the case of text data, the frequency of occurrence of a keyword may be used as the degree of importance. One example of the frequency of occurrence of a keyword may be the ratio to the number of occurrences of all keywords. In the present embodiment, the degree of importance is used as one example of weight information indicating the weight of extracted information.

Next, an operation in the storage node 20 in the present embodiment is described in detail. Typically, various forms of data, such as text data and image data can be used as storing target data. The following description is based on the premise that only data having a specific form is stored in the storage node 20. That is, it is assumed that, before this example operation, the form of storing target data is determined on the basis of its additive information; if the form of the storing target data is not that specific form, the storing target data is transferred to a storage node (not illustrated) other than the storage nodes 20a to 20c.

Figure 3:
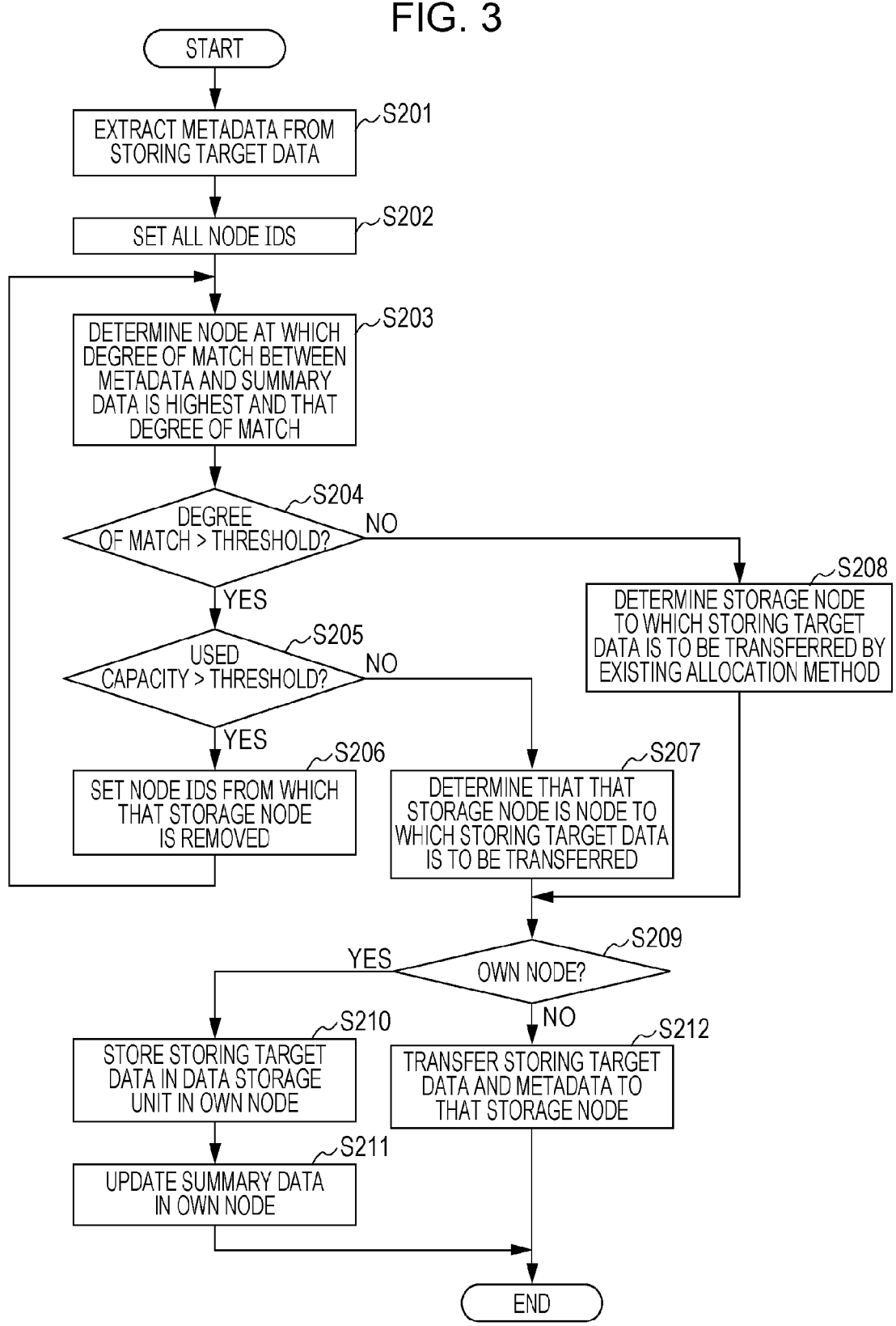
FIG. 3 is a flowchart that illustrates an example operation in a storage node in the first embodiment of the present invention.

First, an operation occurring when the storage node 20 receives storing target data from the client 10 is described. Turning to FIG. 3, a flowchart that illustrates an example operation in the storage node 20 at that time is depicted. When the operation starts, in the storage node 20, first, the metadata extraction unit 21 extracts metadata from the storing target data received from the client 10 (step 201). The extracted metadata is output to the node determination unit 24 together with the storing target data.

Then, the node determination unit 24 sets all node IDs retained in the summary data memory unit 23 as objects for comparison (step 202). Of the node IDs set as the objects for comparison, the node ID associated with summary data having the highest degree of match with the metadata received from the metadata extraction unit 21 and that degree of match (highest degree of match) are determined (step 203). Here, the degree of match may be calculated by identifying the metadata that is the same as the metadata received from the metadata extraction unit 21 from among the metadata included in the summary data and using the degree of importance corresponding to the identified metadata, for example, the sum of the degrees of importance.

The node determination unit 24 determines whether the determined highest degree of match exceeds a predetermined threshold (step 204). When it is determined that the highest degree of match exceeds the predetermined threshold, the node determination unit 24 refers to capacity information retained in the capacity information memory unit 22 and determines whether the used capacity corresponding to the node ID determined in step 203 exceeds a predetermined threshold (step 205). When it is determined that the used capacity exceeds the predetermined threshold, node IDs from which that node ID is removed are newly set as objects for comparison (step 206), and processing of steps 203 to 205 is repeated.

When it is determined in step 205 that the used capacity does not exceed the threshold, the node determination unit 24 determines that the storage node 20 of the node ID determined in step 203 is the storage node 20 to which the storing target data is to be transferred (step 207). Determination in step 204 that the highest degree of match does not exceed the threshold reveals that data similar to the storing target data is not stored in any of the storage nodes 20. Accordingly, in such a case, the node determination unit 24 determines the storage node 20 to which the storing target data is to be transferred using a known allocation method, such as consistent hashing (step 208).

The node ID determined in this way, the storing target data, and the metadata are output to the data transfer unit 25. The data transfer unit 25 determines on the basis of the node ID received from the node determination unit 24 whether the storage node 20 to which the storing target data is to be transferred is its own node or another storage node 20 (step 209).

When the data transfer unit 25 determines that the storage node 20 to which the storing target data is to be transferred is its own node, the data transfer unit 25 stores the storing target data in the data storage unit 27 in its own node (step 210). The metadata is sent to the summary data registration unit 26, and the summary data registration unit 26 updates the summary data corresponding to the node ID of its own node retained in the summary data memory unit 23 with the metadata sent from the data transfer unit 25 (step 211). Specifically, when the metadata sent from the data transfer unit 25 is not contained in the summary data corresponding to the node ID of its own node, which metadata is added and the degree of importance corresponding to that metadata is newly registered. When the metadata sent from the data transfer unit 25 is contained in the summary data corresponding to the node ID of its own node, the degree of importance corresponding to that metadata is made to reflect the degree of importance of the metadata sent from the data transfer unit 25.

When determining that the storage node 20 to which the storing target data is to be transferred is another storage node 20, the data transfer unit 25 transfers the storing target data and the metadata to the data transfer unit 25 in that storage node 20 (step 212).

Next, an operation in determining the storage node 20 to which storing target data received from the client 10 is to be transferred is described using a concrete example. FIG. 4 illustrates a concrete example of summary data retained in the summary data memory units 23a and 23b when the storage node 20a stores a collection of mathematical papers and the storage node 20b stores a collection of novels. As described above, because the storage nodes 20a and 20b exchange summary data, the summary data retained in the summary data memory unit 23a and that in the summary data memory unit 23b are considered to be the same and only one kind of summary data is illustrated.

In FIG. 4, the node ID "A" is the node ID of the storage node 20a, and the node ID "B" is the node ID of the storage node 20b. Because the storing target data is text data, the summary data memory unit 23 retains a keyword as metadata and retains the frequency of occurrence of the keyword as the degree of importance. Specifically, because the storage node 20a stores a collection of mathematical papers, the keywords "differentiation," "non-Euclidean geometry," "group theory," "focus," and other words are retained as metadata corresponding to the node ID "A," and the frequencies of occurrences of the keywords "8," "2," "3," "3," and other values are retained as the degrees of importance of the metadata. In contrast, because the storage node 20b stores a collection of novels, the keywords "wind," "song," "forest," "focus," and other words are retained as metadata corresponding to the node ID "B," and the frequencies of occurrences of the keywords "3," "2," "2," "1," and other values are retained as the degrees of importance of the metadata.

Here, a case where the storing target data received from the client 10 is a collection of physical papers and the metadata "non-Euclidean geometry" is extracted from this collection of physical papers is discussed. In this case, because the degree of importance of the metadata "non-Euclidean geometry" in the summary data corresponding to the node ID "A" is the degree of match between the metadata extracted from the collection of physical papers and this summary data, the degree of match is "2." In contrast, when the metadata "non-Euclidean geometry" is not retained in the summary data corresponding to the node ID "B," the degree of match is "0." Accordingly, because the former degree of match is higher than the latter degree of match, the collection of physical papers will be stored in the storage node 20a.

Another case where the storing target data received from the client 10 is data of a language textbook and the metadata "wind" is extracted from the language textbook is discussed below.

In this case, when the metadata "wind" is not retained in the summary data corresponding to the node ID "A," the degree of match is "0." In contrast, because the degree of importance of the metadata "wind" in the summary data corresponding to the node ID "B" is the degree of match between the metadata extracted from the language textbook and this summary data, the degree of match is "3." Accordingly, because the latter degree of match is higher than the former degree of match, the language textbook will be stored in the storage node 20b.

Still another case where the storing target data received from the client 10 is a collection of physical papers and the metadata "focus" is extracted from this collection of physical papers is discussed below.

In this case, because the degree of importance of the metadata "focus" in the summary data corresponding to the node ID "A" is the degree of match between the metadata extracted from the collection of physical papers and this summary data, the degree of match is "3." In contrast, because the degree of importance of the metadata "focus" in the summary data corresponding to the node ID "B" is the degree of match between the metadata extracted from the collection of physical papers and this summary data, the degree of match is "1." Accordingly, because the former degree of match is higher than the latter degree of match, the collection of physical papers will be stored in the storage node 20a.

Next, an operation occurring when the storage node 20 receives storing target data and metadata from another storage node 20 is described. When receiving the storing target data and the metadata from another storage node 20, the data transfer unit 25 first stores the storing target data in the data storage unit 27. The metadata is sent to the summary data registration unit 26, and the summary data registration unit 26 updates the summary data corresponding to the node ID of its own node retained in the summary data memory unit 23 with the metadata sent from the data transfer unit 25. Specifically, when the metadata sent from the data transfer unit 25 is not contained in the summary data corresponding to the node ID of its own node, which metadata is added and the degree of importance corresponding to that metadata is newly registered. When the metadata sent from the data transfer unit 25 is contained in the summary data corresponding to the node ID of its own node, the degree of importance corresponding to that metadata is made to reflect the degree of importance of the metadata sent from the data transfer unit 25.

Next, an operation occurring when the storage node 20 receives summary data from another storage node 20 is described below. Here, it is assumed that only a part of summary data changed in another storage node 20 after the preceding reception of the summary data is received. When receiving summary data from another storage node 20, first, the data transfer unit 25 sends the node ID of that storage node 20 and the summary data to the summary data registration unit 26. The summary data registration unit 26 updates the summary data corresponding to that node ID retained in the summary data memory unit 23 with the summary data sent from the data transfer unit 25. Specifically, when the metadata in the summary data sent from the data transfer unit 25 is not contained in the summary data corresponding to that node ID, which metadata is added and the degree of importance corresponding to that metadata is newly registered. When the metadata in the summary data sent from the data transfer unit 25 is contained in the summary data corresponding to that node ID, the degree of importance of that metadata is made to reflect the degree of importance of the metadata sent from the data transfer unit 25.

When storing target data elements are sequentially stored in the storage node 20 in this way, information will be added to the content of summary data and thus the content will be changed. Accordingly, a large gap may arise between the metadata and the summary data in currently stored data, so it is necessary to reexamine the degree of match between the data stored in the data storage unit 27 and the summary data. Therefore, in the present embodiment, the function of conducting such reexamination may be provided.

Specifically, the processing substantially the same as that illustrated in FIG. 3 is performed on not storing target data received from the client 10 but data stored in the data storage unit 27. When it is determined in step 204 that the highest degree of match does not exceed the threshold, because it is not necessary to move the data, the processing proceeds directly to step 209. When it is determined in step 209 that the storage node 20 to which the storing target data is to be transferred is the node of its own, because the data is not moved, the processing is completed. This function operates entirely in the background. This function also serves to move the data to an appropriate node when a new storage node 20 is added.

Figure 5:
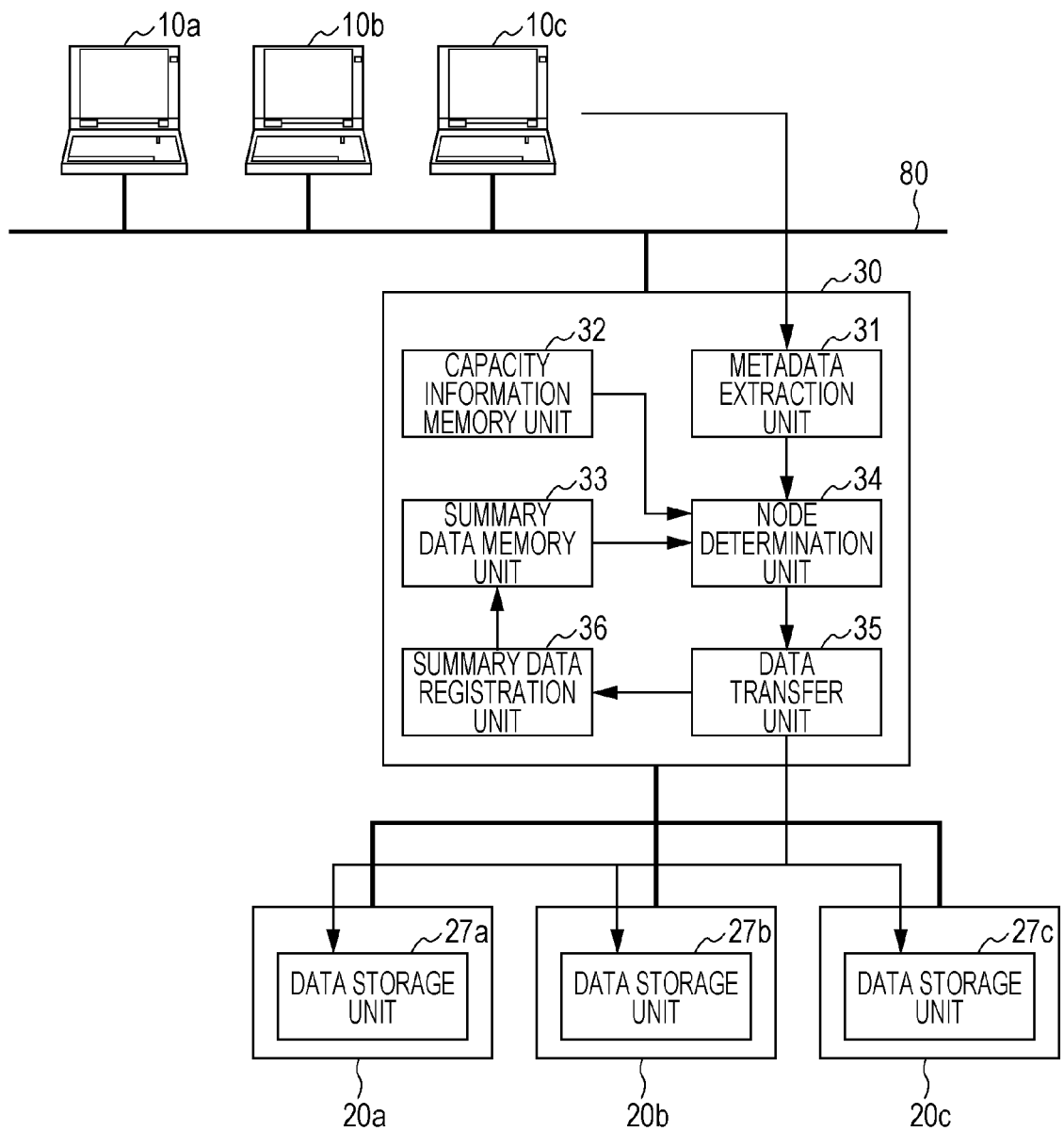
FIG. 5 is a block diagram that illustrates an example configuration of a computer system to which a second embodiment of the present invention is applied.

In an alternative embodiment, a second embodiment is now described. FIG. 5 is a block diagram that illustrates an example configuration of a computer system to which a second embodiment is applied. In the first embodiment, summary data in all the storage nodes 20 is stored in a distributed manner in the storage nodes 20 and regularly exchanged between the storage nodes 20. In contrast, in the second embodiment, a control node 30 for storing summary data in all the storage nodes 20 as a dedicated node is disposed.

As illustrated in FIG. 5, the computer system is configured such that the clients 10*a* to 10*c*, the storage nodes 20*a* to 20*c*, and the control node 30 are connected over the network 80. Each of the clients 10*a* to 10*c* is a computer that can transmit storing target data to the control node 30 over the network 80. The clients 10*a* to 10*c* illustrated in FIG. 5 may be referred to as the clients 10 when it is not necessary to differentiate among them. In FIG. 5, the number of the clients 10 is three, but any number may be used.

Each of the storage nodes 20*a* to 20*c* is a node containing a storage that can store storing target data received from any of the clients 10*a* to 10*c*. The storage nodes 20*a* to 20*c* illustrated in FIG. 5 may be referred to as the storage nodes 20 when it is not necessary to differentiate among them. In FIG. 5, the number of the storage nodes 20 is three, but any number may be used.

The control node 30 is a node that controls storing of data in the storage nodes 20*a* to 20*c* and allocates storing target data received from the clients 10*a* to 10*c* to the storage nodes 20*a* to 20*c*. The configuration of the control node 30 is described in detail below.

The control node 30 includes a metadata extraction unit 31, a capacity information memory unit 32, a summary data memory unit 33, a node determination unit 34, a data transfer unit 35, and a summary data registration unit 36. The metadata extraction unit 31, the capacity information memory unit 32, the summary data memory unit 33, and the node determination unit 34 are substantially the same as the metadata extraction unit 21, the capacity information memory unit 22, the summary data memory unit 23, and the node determination unit 24, respectively, which are described in the first embodiment. The detailed description thereof is not repeated here.

The data transfer unit 35 transfers storing target data received from the node determination unit 34 to the storage node 20 of the node ID received from the node determination unit 34 and also outputs the node ID and metadata received from the node determination unit 34 to the summary data registration unit 36. In the present embodiment, the data transfer unit 35 is disposed as one example of a transfer unit configured to transfer input data to the storage unit in the specified storage node and as one example of a transfer unit configured to transfer input data to the specified storage.

The summary data registration unit 36 registers the metadata received from the data transfer unit 35 such that it is contained in the summary data retained in the summary data memory unit 33 in association with the node ID received from the data transfer unit 35. In the present embodiment, the summary data registration unit 36 is disposed as one example of an updating unit configured to update the second characteristic information element indicating the characteristic of the stored data element stored in the storage unit in the specified storage node out of the plurality of second characteristic information elements on the basis of the first characteristic information and as one example of an updating unit configured to update the second characteristic information element indicating the characteristic of the stored data element stored in the specified storage out of the plurality of second characteristic information elements on the basis of the first characteristic information.

The configuration of the storage node 20 is also described below.

The storage node 20 includes the data storage unit 27. In FIG. 5, the reference numerals of the storage nodes 20 have the affixes "a", "b", and "c". In the following description, however, the reference numerals have none of the affixes "a", "b", and "c".

The data storage unit 27 is a storage that can store storing target data received from the client 10. Here, the data storage unit 27 has a known de-duplication function, by which duplicates of the stored data can be removed. In the present embodiment, the de-duplication function is used as one example of the function of storing data in a state in which duplicates of data having the same or similar characteristics are removed, and the data storage unit 27 is disposed as one example of a storage unit configured to store data.

The content retained in the summary data memory unit 33 is substantially the same as the content retained in the summary data memory unit 23 described in the first embodiment. The detailed description thereof is not repeated here.

Next, an operation in the control node 30 in the present embodiment is described in detail below. Typically, various forms of data, such as text data and image data can be used as storing target data. The following description is based on the premise that only data having a specified form is stored in the storage node 20. That is, it is assumed that, before this example operation, the form of storing target data is determined on the basis of its additive information; if the form of the storing target data is not that specified form, the storing target data is transferred to a storage node (not illustrated) other than the storage nodes 20a to 20c.

Figure 6:
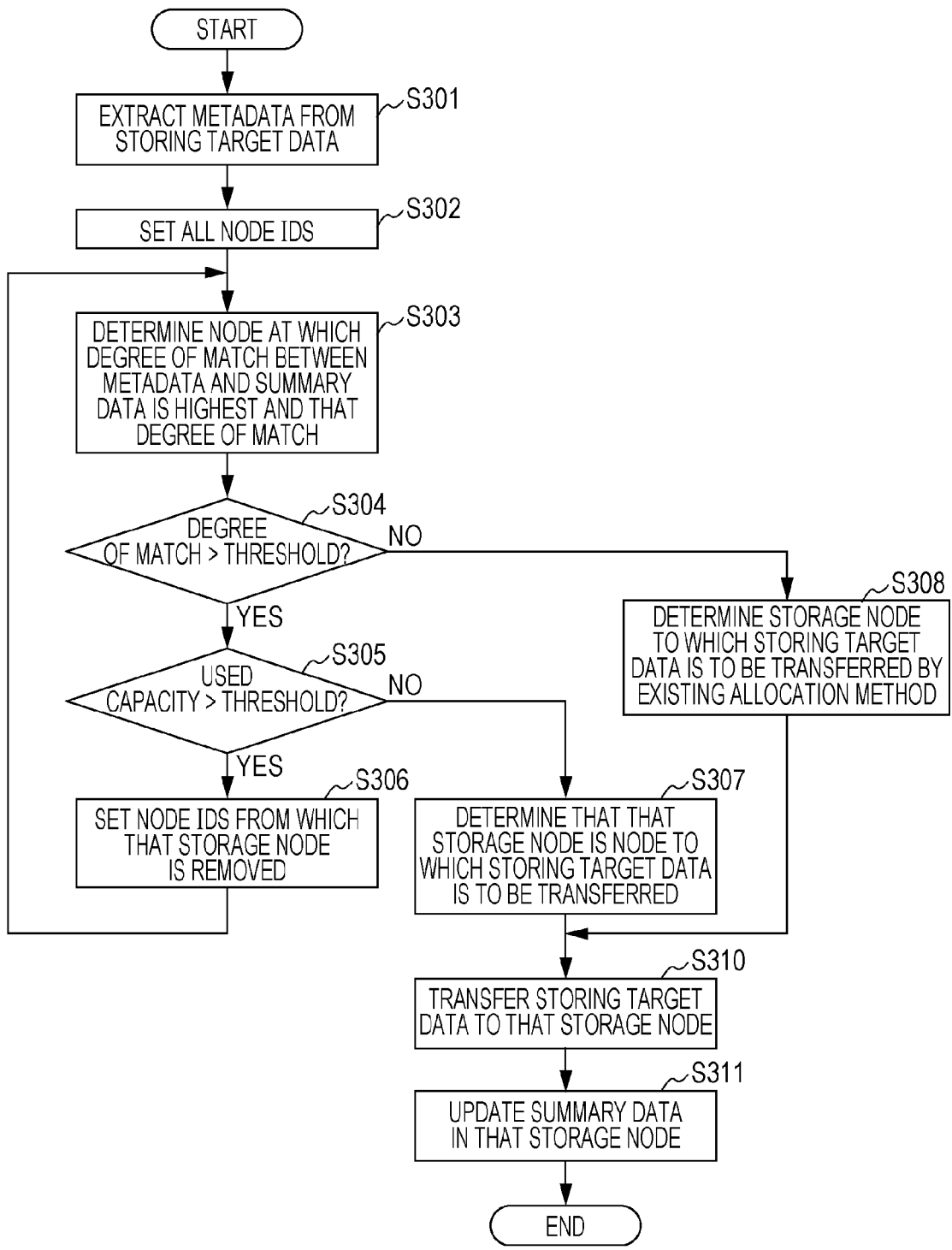
FIG. 6 is a flowchart that illustrates an example operation in a control node in the second embodiment of the present invention.

FIG. 6 is a flowchart that illustrates an example operation in the control node 30 occurring when storing target data is received from the client 10. When the operation starts, in the storage node 30, first, the metadata extraction unit 31 extracts metadata from the storing target data received from the client 10 (step 301). The extracted metadata is output to the node determination unit 34 together with the storing target data.

Then, the node determination unit 34 sets all node IDs retained in the summary data memory unit 33 as objects for comparison (step 302). Of the node IDs set as the objects for comparison, the node ID associated with summary data having the highest degree of match with the metadata received from the metadata extraction unit 31 and that degree of match (highest degree of match) are determined (step 303). Here, the degree of match may be calculated by identifying the metadata that is the same as the metadata received from the metadata extraction unit 31 from among the metadata included in the summary data and using the sum of the degrees of importance corresponding to the identified metadata.

The node determination unit 34 determines whether the determined highest degree of match exceeds a predetermined threshold (step 304). When it is determined that the highest degree of match exceeds the threshold, the node determination unit 34 refers to capacity information retained in the capacity information memory unit 32 and determines whether the used capacity corresponding to the node ID determined in step 303 exceeds a predetermined threshold (step 305). When it is determined that the used capacity exceeds the threshold, node IDs from which that node ID is removed are newly set as objects for comparison (step 306), and processing of steps 303 to 305 is repeated.

When it is determined in step 305 that the used capacity does not exceed the threshold, the node determination unit 34 determines that the storage node 20 of the node ID determined in step 303 is the storage node 20 to which the storing target data is to be transferred (step 307).

Determination in step 304 that the highest degree of match does not exceed the threshold reveals that data similar to the storing target data is not stored in any of the storage nodes 20. Accordingly, in such a case, the node determination unit 34 determines the storage node 20 to which the storing target data is to be transferred using a known allocation method, such as consistent hashing (step 308).

The node ID determined in this way, the storing target data, and the metadata are output to the data transfer unit 35. Then, the data transfer unit 35 stores the storing target data in the data storage unit 27 in the storage node 20 of the node ID received from the node determination unit 34 (step 310). The metadata is sent to the summary data registration unit 36, and the summary data registration unit 36 updates the summary data corresponding to that node ID retained in the summary data memory unit 33 with the metadata sent from the data transfer unit 35 (step 311). Specifically, when the metadata sent from the data transfer unit 35 is not contained in the summary data corresponding to that node ID, which metadata is added and the degree of importance corresponding to that metadata is newly registered. When the metadata sent from the data transfer unit 35 is contained in the summary data corresponding to that node ID, the degree of importance corresponding to that metadata is made to reflect the degree of importance of the metadata sent from the data transfer unit 35.

When storing target data elements are sequentially stored in the storage node 20 in this way, information will be added to the content of summary data and thus the content will be changed. Accordingly, a large gap may arise between the metadata and the summary data in currently stored data, so it is necessary to reexamine the degree of match between the data stored in the data storage unit 27 and the summary data. Therefore, in the present embodiment, the function of conducting such reexamination may be provided.

Specifically, the processing substantially the same as that illustrated in FIG. 6 is performed on not storing target data received from the client 10 but data stored in the data storage unit 27. When it is determined in step 304 that the highest degree of match does not exceed the threshold, because it is not necessary to move the data, the processing proceeds directly to step 310. When it is determined in step 307 that the storage node 20 to which the data is to be transferred is the storage node in which the data exists, because that data is not moved, the processing skips steps 310 and 311 and is completed. This function operates entirely in the background. This function also serves to move the data to an appropriate node when a new storage node 20 is added.

As described above, in the present embodiment, metadata in stored data is summarized for each storage node 20 as summary data of the storage node 20, and to store subsequent data, the metadata and the summary data in each storage node 20 are compared, the storage node 20 at which the degree of match is the highest is selected, and the data is made to be stored in that selected storage node 20. When data is stored in the plurality of storage nodes 20 in this way, the data in each storage node 20 contains much data having a large amount of common metadata and includes many similar contents. Here, data having many similar contents is expected to have many duplicate portions. That is, selecting the storage node 20 at which many duplicates to be removed are highly expected and storing data in that storage node 20 enables improvement in the overall efficiency of storage utilization as the storage system including the plurality of storage nodes 20.

In the present embodiment, the degree of match between metadata in storing target data and summary data in each storage node 20 is determined, and when the highest degree of match with the summary data in a storage node 20 exceeds a predetermined threshold, the storing target data is made to be stored in that storage node 20. The present invention is not limited to this process. For example, if the degree of match with summary data in a storage node 20 is the highest, the storing target data may be made to be stored in that storage node 20 without determination whether the degree of match exceeds a predetermined threshold. Alternatively, even when the degree of match with summary data in a storage node 20 is not the highest, if the degree of match is high to some extent and another condition is satisfied, the storing target data may be made to be stored in that storage node 20.

In the present embodiment, the fact that the used capacity in the storage node 20 exceeds the predetermined threshold is the condition for storing the storing target data in the storage node 20. Alternatively, another condition based on the used capacity in the storage node 20 may be the condition for storing the storing target data in the storage node 20.

Furthermore, in the present embodiment, summary data in the storage node 20 contains metadata extracted from data stored in the storage node 20 and the degree of importance of the metadata. The present invention is not limited to this inclusion. For example, the degree of importance of metadata may not be included in summary data. In this case, as the degree of match, a numerical value calculated on the basis of the number of items that are the same as metadata extracted from storing target data from among metadata included in summary data, for example, the number of the items itself may be used. Alternatively, metadata extracted from data stored in the storage node 20 may not be included in summary data, information for characterizing data stored in the storage node 20 obtained by another method may be included in the summary data.

Moreover, in the present embodiment, in determining the degree of match between metadata in storing target data and summary data in each storage node 20, data that is the same as metadata extracted from the storing target data from among metadata included in the summary data is identified. Alternatively, of metadata included in summary data, data having a characteristic the same as or similar to metadata extracted from storing target data may be identified.

Figure 7:
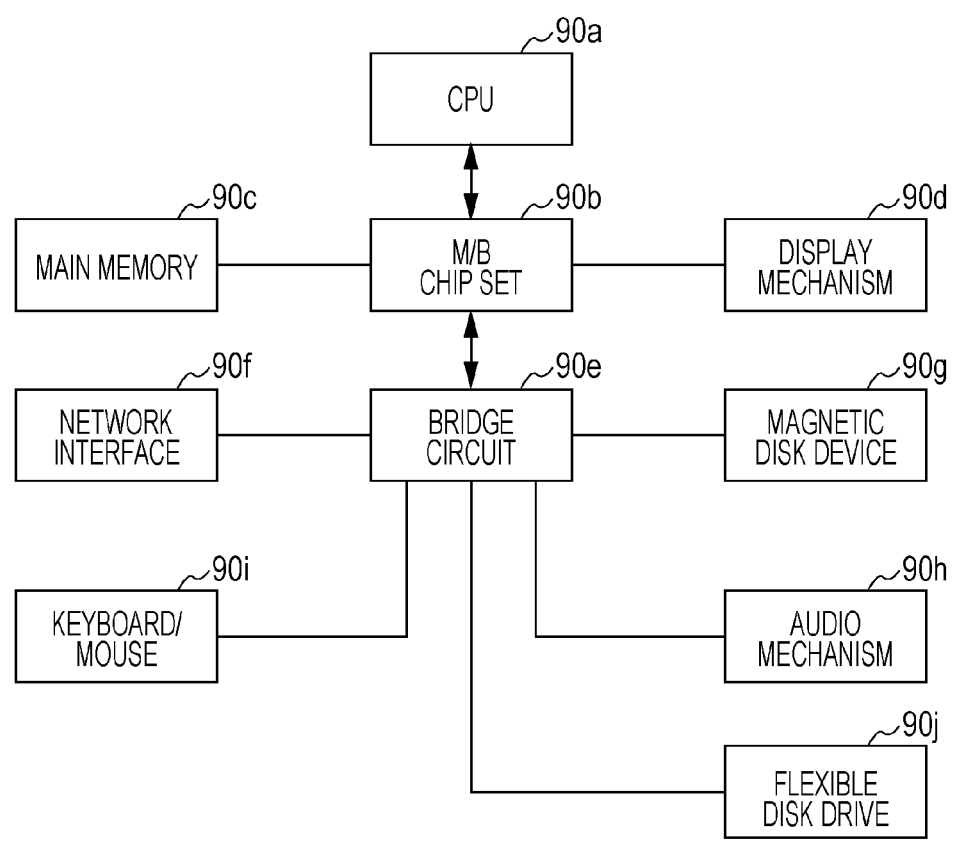
FIG. 7 illustrates a hardware configuration of a computer to which the embodiments of the present invention are applicable.

Lastly, a hardware configuration of a computer in which the present embodiment is suitably applicable is described. FIG. 7 illustrates one example of the hardware configuration of such a computer. As illustrated in FIG. 7, the computer includes a central processing unit (CPU) 90a, which is computing means, a main memory 90c connected to the CPU 90a through a motherboard (M/B) chip set 90b, and a display mechanism 90d connected to the CPU 90a through the same M/B chip set 90b. The M/B chip set 90b is connected to, through a bridge circuit 90e, a network interface 90f, a magnetic disk device (HDD) 90g, an audio mechanism 90h, a keyboard/mouse 90i, and a flexible disk drive 90j.

In FIG. 7, the components are connected to each other through a bus. For example, a CPU bus is used in connection between the CPU 90a and the M/B chip set 90b and connection between the M/B chip set 90b and the main memory 90c. The M/B chip set 90b and the display mechanism 90d may be connected to each other through an accelerated graphics port (AGP). If the display mechanism 90d includes a video card that supports PCI Express, the M/B chip set 90b and that video card are connected to each other through a peripheral component interconnect express (PCIe) bus. A PCI express can be used in the connection between the bridge circuit 90e and the network interface 90f, for example. A serial advanced technology attachment (AT attachment), a parallel ATA, and a PCI can be used in the connection between the bridge circuit 90e and the magnetic disk device 90g. A universal serial bus (USB) can be used in the connection between the bridge circuit 90e and each of the keyboard/mouse 90i and the flexible disk drive 90j.

The present invention may be achieved entirely by hardware, or alternatively, achieved entirely by software. The present invention may also be achieved by both hardware and software. The present invention may be achieved as a computer, a data processing system, or a computer program. This computer program may be retained in a computer-readable medium and provided there through. Examples of such a medium can include electronic, magnetic, optical, electromagnetic, infrared, and semiconductor systems (apparatuses and devices) and propagation media. Examples of the computer-readable medium can include a semiconductor, a solid-state storage device, magnetic tape, a detachable computer diskette, a random-access memory (RAM), a read-only memory (ROM), a rigid magnetic disk, and an optical disk. Examples of the optical disk at present can include a compact-disk read-only memory (CD-ROM), a compact-disk read/write (CD-R/W), and a digital versatile disc (DVD). Although the present invention has been described with some illustrative embodiments in the above, the present invention is not limited to those embodiments. It would be apparent for those skilled in the art that various changes can be made and alternatives can be adopted without departing from the sprit and scope of the present invention.

It will be clear to one of ordinary skill in the art that the preferred embodiment of the present invention is industrially applicable in providing advantageous efficiencies in the operation of distributed cluster storage networks. It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In one alternative, the preferred embodiment of the present invention may be realized in the form of a computer implemented method of deploying a service comprising steps of deploying computer program code operable to, when deployed into a computer infrastructure and executed thereon, cause said computer system to perform all the steps of the method.

In a further alternative, the preferred embodiment of the present invention may be realized in the form of a data carrier having functional data thereon, said functional data comprising functional computer data structures to, when loaded into a computer system and operated upon thereby, enable said computer system to perform all the steps of the method. It will be clear to one skilled in the art that many improvements and modifications can be made to the foregoing exemplary embodiment without departing from the scope of the present invention.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A system for storing data in a plurality of storage nodes, each of the plurality of storage nodes comprising:
   a storage unit configured to store data in a state in which duplicates of data having the same or similar characteristics are removed;
   an extraction unit configured to extract, from input data that is input to the plurality of storage nodes, first characteristic information indicating a characteristic of the input data;
   a memory unit configured to retain a plurality of second characteristic information elements indicating respective characteristics of stored data elements stored in the storage unit in the plurality of storage nodes, wherein each of the plurality of second characteristic information elements includes a plurality of extracted information elements extracted from the respective characteristics of stored data elements and weight information elements indicating respective weights of the plurality of extracted information elements;
   a determination unit configured to determine a specific storage node in which the input data is to be stored, out of the plurality of storage nodes, by determining a degree of match between the first characteristic information extracted by the extraction unit and each of the plurality of second characteristic information elements retained in the memory unit on the basis of the weight information element indicating the weight of the extracted information element having a characteristic that is the same as or similar to the first characteristic information out of the plurality of extracted information elements included in each of the plurality of second characteristic information elements;
   a transfer unit configured to, when the specific storage node determined by the determination unit is the storage node, transfer the input data to the storage unit in the storage node and, when the specific storage node determined by the determination unit is an alternative storage node, transfer the input data to the alternative storage node; and
   an updating unit configured to, when the input data is transferred by the transfer unit to the storage unit in the storage node, update the second characteristic information element indicating the characteristic of the stored data element stored in the storage unit in the storage node, out of the plurality of second characteristic information elements retained in the memory unit, on the basis of the first characteristic information extracted by the extraction unit;
      wherein the updating unit is configured to, when another second characteristic information element indicating the characteristic of the data element stored in the storage unit in another storage node is transferred from the alternative storage node, update the second characteristic information element indicating the characteristic of the data element stored in the storage unit in the alternative storage node, on the basis of the other second characteristic information element.

2. A system for controlling storing of data in a plurality of storage nodes using a control node,
   each of the plurality of storage nodes comprising:
      a storage unit configured to store data in a state in which duplicates of data having the same or similar characteristics are removed, and
      the control node comprising:

an extraction unit configured to extract, from input data that is input to the system, first characteristic information indicating a characteristic of the input data;

a memory unit configured to retain a plurality of second characteristic information elements indicating respective characteristics of stored data elements stored in the storage units in the plurality of storage nodes, each of the plurality of second characteristic information elements including a plurality of extracted information elements extracted from the respective characteristics of stored data elements and weight information elements indicating respective weights of the plurality of extracted information elements;

a determination unit configured to determine a specific storage node in which the input data is to be stored, out of the plurality of storage nodes, by determining a degree of match between the first characteristic information extracted by the extraction unit and each of the plurality of second characteristic information elements retained in the memory unit on the basis of the weight information element indicating the weight of the extracted information element having a characteristic that is the same as or similar to the first characteristic information out of the plurality of extracted information elements included in each of the plurality of second characteristic information element;

a transfer unit configured to transfer the input data to the storage unit in the specific storage node determined by the determination unit; and an updating unit configured to update the second characteristic information element indicating the characteristic of the stored data element stored in the storage unit in the specific storage node, out of the plurality of second characteristic information elements retained in the memory unit, on the basis of the first characteristic information extracted by the extraction unit;

wherein the updating unit is configured to, when another second characteristic information element indicating the characteristic of the data element stored in the storage unit in another storage node is transferred from the alternative storage node, update the second characteristic information element indicating the characteristic of the data element stored in the storage unit in the alternative storage node, on the basis of the other second characteristic information element.

3. An apparatus for controlling storing of data in a plurality of storages that can store data in a state in which duplicates of data having the same or similar characteristics are removed, the apparatus comprising:

an extraction unit configured to extract, from input data that is input as data to be stored in any of the plurality of storages, first characteristic information indicating a characteristic of the input data;

a memory unit configured to retain a plurality of second characteristic information elements indicating respective characteristics of stored data elements stored in the plurality of storages;

a determination unit configured to determine a specific storage in which the input data is to be stored, out of the plurality of storages, by determining a degree of match between the first characteristic information extracted by the extraction unit and each of the plurality of second characteristic information elements retained in the memory unit;

a transfer unit configured to transfer the input data to the specific storage determined by the determination unit; and an updating unit configured to update the second characteristic information element indicating the characteristic of the stored data element stored in the specific storage, out of the plurality of second characteristic information elements retained in the memory unit, on the basis of the first characteristic information extracted by the extraction unit;

wherein the updating unit is configured to, when another second characteristic information element indicating the characteristic of the data element stored in the storage unit in another storage node is transferred from the alternative storage node, update the second characteristic information element indicating the characteristic of the data element stored in the storage unit in the alternative storage node, on the basis of the other second characteristic information element.

4. The apparatus of claim 3, wherein each of the plurality of second characteristic information elements includes a plurality of extracted information elements extracted from the respective stored data elements stored in the plurality of storages, and the determination unit is configured to determine the degree of match on the basis of a number of extracted information elements having a characteristic that is the same as or similar to the first characteristic information extracted by the extraction unit, out of the plurality of extracted information elements included in each of the plurality of second characteristic information elements retained in the memory unit.

5. The apparatus of claim 3, wherein each of the plurality of second characteristic information elements includes a plurality of extracted information elements extracted from the respective characteristics of stored data elements stored in the plurality of storages and weight information elements indicating respective weights of the plurality of extracted information elements, and the determination unit is configured to determine the degree of match on the basis of the weight information element indicating the weight of the extracted information element having a characteristic that is the same as or similar to the first characteristic information extracted by the extraction unit, out of the plurality of extracted information elements included in each of the plurality of second characteristic information elements.

6. The apparatus of claim 3, wherein the determination unit is configured to determine the specific storage on the basis of the degree of match and an amount of the stored data element stored in each of the plurality of storages.

7. The apparatus of claim 3, wherein the extraction unit is configured to extract, from the stored data element stored in a first storage of the plurality of storages, the first characteristic information indicating a characteristic of the first storage, the determination unit is configured to re-determine a storage in which the stored data element is to be stored, out of the plurality of storages, by determining the degree of match between the first characteristic information extracted by the extraction unit and each of the plurality of second characteristic information elements retained in the memory unit, and the transfer unit is configured to, when the storage determined by the determination unit is an alternative storage other than the first storage, transfer the stored data element to the alternative storage.

8. A method for controlling storing of data in a plurality of storages by a processor device that can store data in a state in which duplicates of data having the same or similar characteristics are removed, the method comprising:
  extracting, from input data that is input as data to be stored in any of the plurality of storages, first characteristic information indicating a characteristic of the input data;
  reading, from a memory unit storing a plurality of second characteristic information elements indicating respective characteristics of stored data elements stored in the plurality of storages, each of the plurality of second characteristic information elements;
  determining a specific storage in which the input data is to be stored, out of the plurality of storages, by determining a degree of match between the extracted first characteristic information and each of the plurality of second characteristic information elements read;
  transferring the input data to the determined specific storage; and
  updating the second characteristic information element indicating the characteristic of the stored data element stored in the specific storage, out of the plurality of second characteristic information elements retained in the memory unit, on the basis of the extracted first characteristic information;
    wherein each of the plurality of second characteristic information elements includes a plurality of extracted information elements extracted from the respective stored data elements stored in the plurality of storages.

9. The method of claim 8, further including determining the degree of match on the basis of a number of extracted information elements having a characteristic that is the same as or similar to the first characteristic information extracted by an extraction unit, out of the plurality of extracted information elements included in each of the plurality of second characteristic information elements.

10. The method of claim 8, wherein each of the plurality of second characteristic information elements includes a plurality of extracted information elements extracted from the respective characteristics of stored data elements stored in the plurality of storages and weight information elements indicating respective weights of the plurality of extracted information elements.

11. The method of claim 8, further including determining the degree of match on the basis of the weight information element indicating the weight of the extracted information element having a characteristic that is the same as or similar to the first characteristic information that is extracted, out of the plurality of extracted information elements included in each of the plurality of second characteristic information elements.

12. The method of claim 8, further including determining the specific storage on the basis of the degree of match and an amount of the stored data element stored in each of the plurality of storages.

13. A computer program product for controlling storing of data in a plurality of storages that can store data in a state in which duplicates of data having the same or similar characteristics are removed in a computing environment using a processor device, the computer program product comprising a non-transitory computer-readable storage medium having computer-readable program code portions stored therein, the computer-readable program code portions comprising:
  a first executable portion for extracting, from input data that is input as data to be stored in any of the plurality of storages, first characteristic information indicating a characteristic of the input data;
  a second executable portion for reading, from a memory unit storing a plurality of second characteristic information elements indicating respective characteristics of stored data elements stored in the plurality of storages, each of the plurality of second characteristic information elements;
  a third executable portion for determining a specific storage in which the input data is to be stored, out of the plurality of storages, by determining a degree of match between the extracted first characteristic information and each of the plurality of second characteristic information elements read;
  a fourth executable portion for transferring the input data to the determined specific storage; and
  a fifth executable portion for updating the second characteristic information element indicating the characteristic of the stored data element stored in the specific storage, out of the plurality of second characteristic information elements retained in the memory unit, on the basis of the extracted first characteristic information;
    wherein the updating unit is configured to, when another second characteristic information element indicating the characteristic of the data element stored in the storage unit in another storage node is transferred from the alternative storage node, update the second characteristic information element indicating the characteristic of the data element stored in the storage unit in the alternative storage node, on the basis of the other second characteristic information element.

14. The computer program product of claim 13, further including a sixth executable portion for determining the degree of match on the basis of a number of extracted information elements having a characteristic that is the same as or similar to the first characteristic information extracted by an extraction unit, out of the plurality of extracted information elements included in each of the plurality of second characteristic information elements.

15. The computer program product of claim 13, wherein each of the plurality of second characteristic information elements includes a plurality of extracted information elements extracted from the respective characteristics of stored data elements stored in the plurality of storages and weight information elements indicating respective weights of the plurality of extracted information elements.

16. The computer program product of claim 13, further including a sixth executable portion for determining the degree of match on the basis of the weight information element indicating the weight of the extracted information element having a characteristic that is the same as or similar to the first characteristic information that is extracted, out of the plurality of extracted information elements included in each of the plurality of second characteristic information elements.

17. The computer program product of claim 13, further including a sixth executable portion for determining the specific storage on the basis of the degree of match and an amount of the stored data element stored in each of the plurality of storages.

* * * * *